United States Patent [19]

Sogawa

[11] Patent Number: 4,761,994
[45] Date of Patent: Aug. 9, 1988

[54] SYSTEM FOR MEASURING QUANTITY OF INTAKE AIR IN AN ENGINE

[75] Inventor: Yoshiyuki Sogawa, Mitaka, Japan

[73] Assignee: Fuji Jukogyo Kabushiki Kaisha, Tokyo, Japan

[21] Appl. No.: 46,023

[22] Filed: May 4, 1987

[30] Foreign Application Priority Data

May 6, 1986 [JP] Japan .................... 61-104413
May 6, 1986 [JP] Japan .................... 61-104414

[51] Int. Cl.⁴ ........................................... G01M 15/00
[52] U.S. Cl. .................................... 73/118.2; 73/204
[58] Field of Search ............... 73/118.2, 204; 123/494

[56] References Cited

U.S. PATENT DOCUMENTS 4,594,987 6/1986 Wataya et al. ............... 73/118.2 X
4,633,839 1/1987 Yasuoka et al. ............... 123/494 X

FOREIGN PATENT DOCUMENTS 57-73831 5/1982 Japan .
59-170428 9/1984 Japan .

*Primary Examiner*—Jerry W. Myracle
*Attorney, Agent, or Firm*—Martin A. Farber

[57] ABSTRACT

A system for measuring quantity of intake air in an engine has an airflow meter provided in an intake passage upstream of a throttle valve for measuring quantity of intake air. The quantity of intake air entered into a space between the throttle valve and cylinders of the engine, without entering into the cylinders is calculated based on engine speed and opening degree of the throttle valve. The difference between the quantity of intake air measured by the airflow meter and the quantity entered in the space is calculated to provide the quantity of intake air actually entered into the cylinders.

1 Claim, 6 Drawing Sheets

SYSTEM FOR MEASURING QUANTITY OF INTAKE AIR IN AN ENGINE

BACKGROUND OF THE INVENTION

The present invention relates to a system for measuring the quantity of an intake air in an engine for a motor vehicle, in order to determine the fuel injection time and the ignition timing.

In a known fuel injection system, an airflow meter is provided in an intake passage at a position upstream of a throttle valve to detect the quantity of intake air (Q). The fuel injection time Tp is determined by a calculation of $Tp=Q/N$ (N is engine speed).

Further, the ignition timing is also determined by using the quantity Q of intake air. Accordingly, a high accuracy is required in the measurement of quantity of intake air. However, in the prior art, it is difficult to accurately measure the quantity of intake air as described hereinafter.

Since the airflow meter is positioned upstream of the throttle valve, the intake air induced into a cylinder of the engine is not directly measured. Namely, there is a space between the throttle valve and the cylinder, such as a chamber formed downstream of the throttle valve and the intake manifold. Accordingly, when the throttle valve is rapidly opened, the induced air enters into the space to increase the pressure in the space. In other words, an amount of air sufficient to increase the pressure in the space is included in the air induced through the throttle valve. The airflow meter measures the quantity of the intake air including the air which is not induced into the cylinder. Accordingly, the measured quantity increases temporarily. If the injection time is calculated based on the increased quantity of intake air, the fuel injector supplies a larger quantity of fuel than a necessary quantity, thereby enriching the air-fuel mixture. The enrichment of the mixture causes a reduction of the output of the engine and increases of noxious emissions such as CO and HC. Further, if the ignition timing is calculated based on the increased quantity of the intake air, the timing deviates from a desired timing.

Similarly, when the throttle valve is closed, the air-fuel ratio and ignition timing deviate from desired values.

SUMMARY OF THE INVENTION

The object of the present invention is to provide a system which may measure the quantity of intake air with accuracy. In accordance with the present invention, the quantity of intake air entered in the space in the intake passage other than the cyclinders of the engine is calculated based on engine speed and opening degree of a throttle valve. Accordingly, the actual quantity induced in the cylinders can be accurately measured by calculating the difference between the quantity of intake air measured by an airflow sensor and the quantity entered into the space.

According to the present invention, there is provided a system for measuring quantity of intake air in an engine for a motor vehicle having an intake passage, a throttle valve provided in the intake passage, the intake passage including a first intake passage upstream of the throttle valve, and a second intake passage between the throttle valve and cylinders of the engine, the system comprising an airflow meter provided in the first intake passage for measuring a first quantity of intake air passing in the first intake passage, first detector means for detecting opening degree of the throttle valve and for producing an opening degree signal, second detector means for producing an engine speed signal, first means responsive to the opening degree signal and to the engine speed signal for producing a pressure signal representative of pressure in the second intake passage, second means responsive to the pressure signal for calculating a second quantity of intake air entered into the second intake passage without entering into the cylinders, and third means for producing a signal representing quantity of intake air actually entered into the cylinders in accordance with the difference between the first quantity and the second quantity.

The first means calculates the pressure based on pressure in the first intake passage, resistance at the throttle valve and resistance in the engine.

The other objects and features of this invention will be apparently understood from the following description with reference to the accompanying drawings.

BRIEF DESCRIPTION OF DRAWINGS

FIG. 2b represents the approximate electrical circuit equivalent of FIG. 2a;

DETAILED DESCRIPTION OF THE PREFERRED EMBODIMENTS

Figure 1:
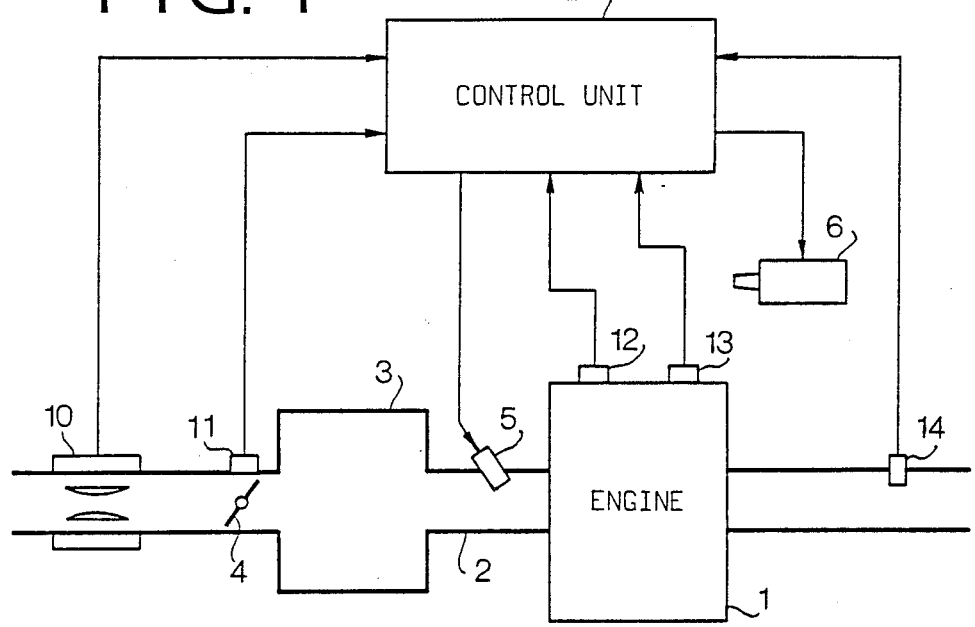
FIG. 1 is a schematic diagram showing a system according to the present invention.

Referring to 1, in an intake passage 2 of an engine 1, a throttle chamber 3 is provided downstream of a throttle valve 4 so as to absorb the pulsation of intake air. An airflow meter 10 in the form of a hot wire is provided upstream of the throttle valve 4 and multiple fuel injectors 5 are provided in the intake passage at positions adjacent intake values so as to supply fuel to each cylinder of the engine 1. A throttle position sensor 11, coolant temperature sensor 12, crank angle sensor 13 and $O_2$-sensor 14 are provided for detecting respective conditions, and output signals of the sensors are applied to a control unit 20 comprising a microcomputer to operate the fuel injectors 5 and an ignition coil 6. The control unit 20 makes a computation of a basic fuel injection time $Tp=Q/N$ and the basic fuel injection time is corrected by a coolant temperature signal from the sensor 12 and a feedback signal from the $O_2$-sensor 14.

Figure 7:
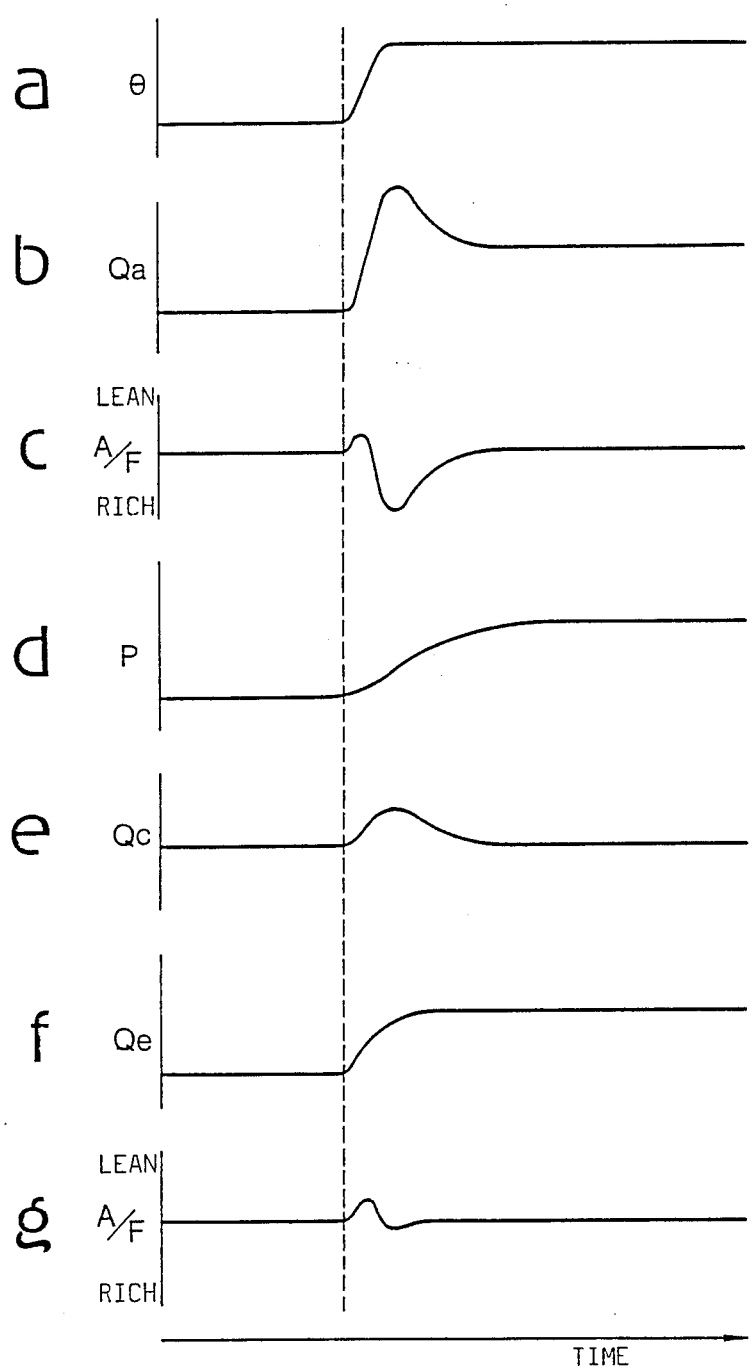
FIG. 7 including parts a-g, shows variations of various values.

A principle of measurement of the quantity of intake air according to the present invention is described with reference to FIGS. 2 and 7. When the throttle valve 4 is rapidly opened (FIG. 7(a)), the quantity Qa measured by the airflow meter 10 increases to overshoot as shown in FIG. 7(b). FIG. 7(c) shows the variation of air-fuel ratio in the prior art where the air-fuel ratio becomes small (rich mixture). The control unit 20 operates to estimate the quantity Qe inducted in a cylinder of the engine 1 by calculating the quantity Qc entered into the chamber 3 and intake passage 2 to increase the pressure therein at the opening of the throttle valve, as described hereinafter.

Figure 2A:
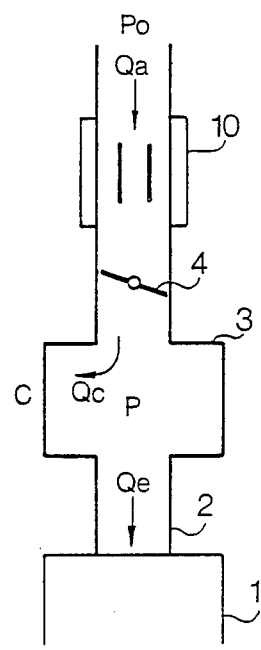
FIG. 2a is a schematic view of an intake system.
Figure 2B:
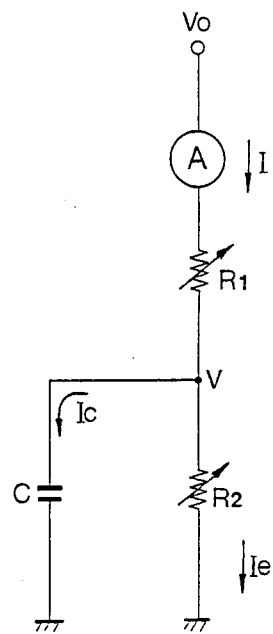

Referring to FIGS. 2a and 2b, the intake system schematically illustrated in FIG. 2a approximately equals to an electric circuit of FIG. 2b. Namely, the pressure P in the intake passage 2 downstream of the throttle valve 4 and chamber 3 corresponds to the voltage V and the quantity Qa corresponds to the current I in FIG. 2b. Po represents a pressure upstream of the throttle valve 4 and corresponds to the voltage Vo in FIG. 2b. The voltage V is obtained by the following equation.

$$V = Vo \times (R_1/(R_1 + R_2)) \times (1 - e^{-t/c \frac{R_1 \cdot R_2}{R_1 + R_2}})$$

The resistance $R_1$ corresponds to the resistance at the throttle valve 4 and the resistance $R_2$ corresponds to the resistance in the engine 1.

If the voltage V and current I are substituted with P and Qa, the pressure P is $$P = Po \times (R_1/(R_1 + R_2)) \times (1 - e^{-t/c \frac{R_1 \cdot R_2}{R_1 + R_2}})$$

where $$R_1 = \frac{Po - P}{Qa}, \quad R_2 = \frac{P}{Qe}$$

and C=a constant for the capacity of the intake passage and the throttle chamber 3. It will be seen that the pressure P delays with respect to the input signal with a first order lag determined by the time constant $T = C \times R_1 R_2/(R_1 + R_2)$.

Figure 4:
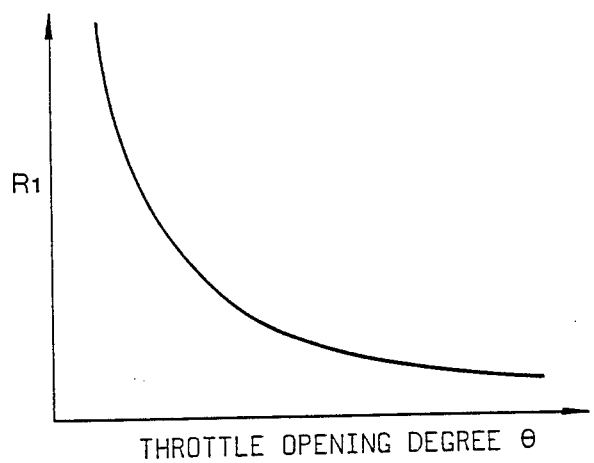
FIGS. 4 and 5 are graphs showing relationships between resistances $R_1$ and $R_2$ and throttle opening degree $\theta$ and engine speed N.
Figure 5:
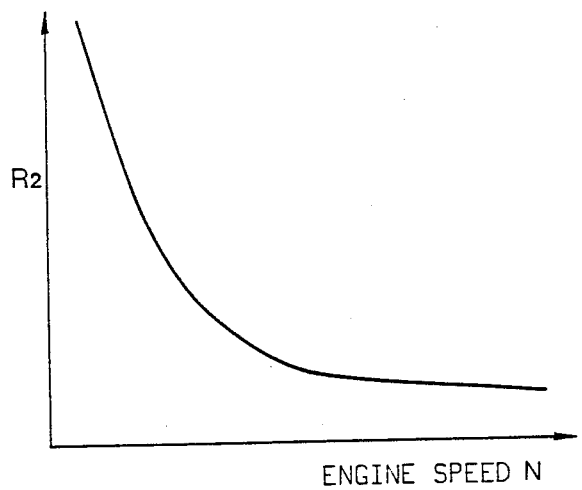

On the other hand, as shown in FIGS. 4 and 5, the resistance $R_1$ can be provided as a function of the opening degree $\theta$ of the throttle valve 4 and the resistance $R_2$ can be provided as a function of engine speed N. Accordingly, resistances $R_1$ and $R_2$ are stored in memories as the function of $\theta$ and N, and pressure Po and capacity C are also stored in memories. Accordingly, if a first order lag treating means is provided in the control unit, the pressure P in the intake passage downstream of the throttle valve 4 and the chamber 3 can be determined.

The quantity Qc increasing the pressure P can be calculated by using the differentiation of the pressure P at throttle opening with respect to time (dp/dt) as follows.

$$Qc = dp/dt \times C_1 \quad (C_1 = \text{constant})$$

Accordingly, the necessary quantity Qe is $$Qe = Qa - Qc$$

Thus, the necessary fuel injection time Tp is calculated based on the quantity Qe. FIGS. 7(d) to (f) show variations of pressure P and quantities Qc and Qe, and FIG. 7(g) shows an improved air-fuel ratio.

Figure 3:
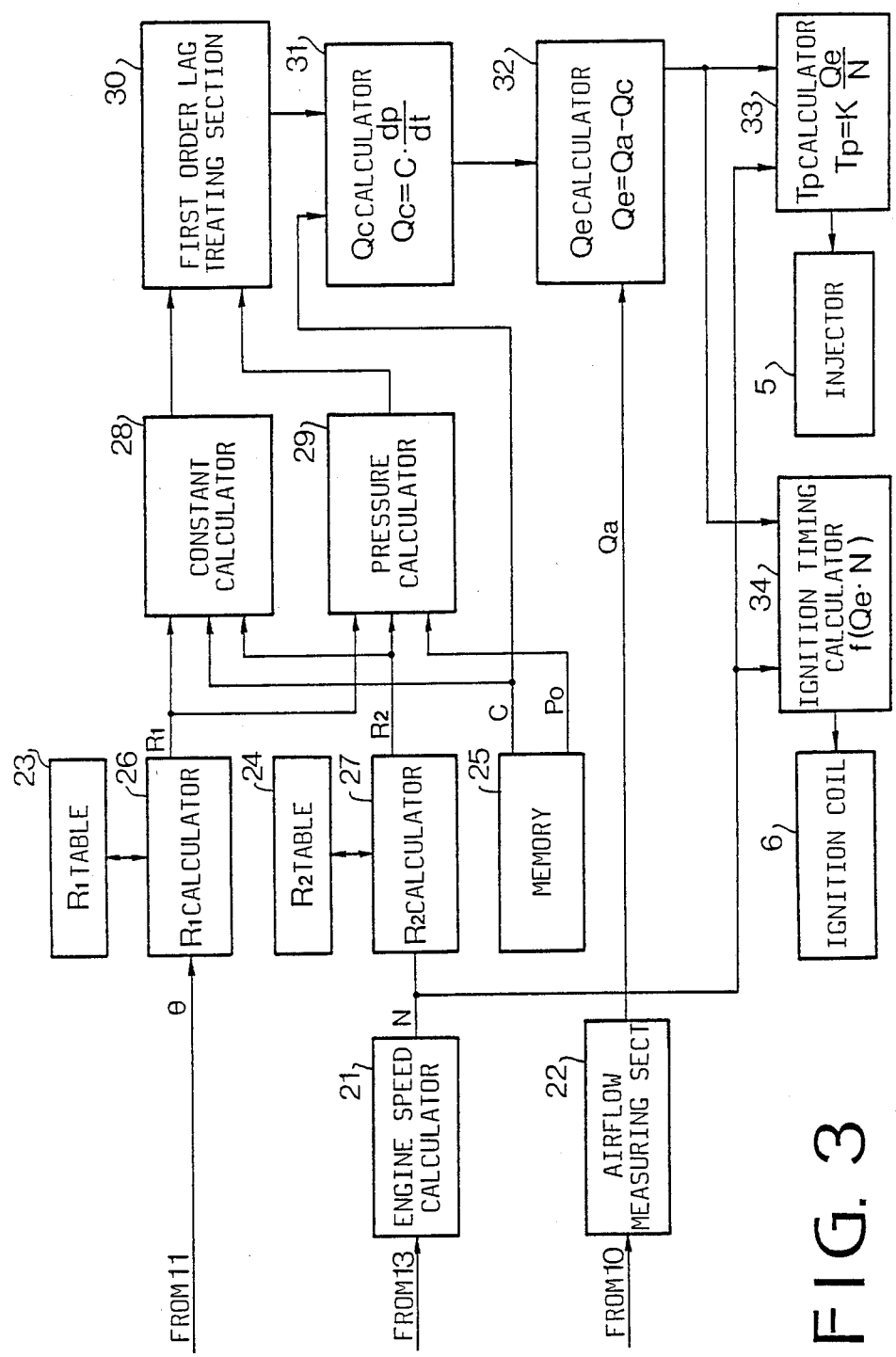
FIG. 3 is a block diagram showing an embodiment of the present invention.

Referring to FIG. 3 showing the control unit 20 as an embodiment of the invention, the control unit is provided with an engine speed calculator 21 for calculating engine speed N based on the output signal of the crank angle angle sensor 13, an airflow measuring section 22 for producing the quantity Qa from the output signal of the airflow meter 10, and an $R_1$ calculator 26 for calculating the resistance $R_1$ at the throttle valve 4 based on the output signal of an $R_1$ table 23 in the memory. An $R_2$ calculator 27 calculates the resistance $R_2$ in the engine 1 in accordance with the engine speed N and the output signal of an $R_2$ table 24. Further a memory 25 stores data for the constant C for the capacity and the pressure Po. A time constant calculator 28 calculates the time constant T based on output signals $R_1$, $R_2$, C of calculators 26, 27 and memory 25. A pressure calculator 29 is provided to make the calculation of the pressure in the intake passage, $P_B = Po \times R_2/(R_1 + R_2)$ based on output signals $R_1$, $R_2$, Po of calculators 26, 27 and memory 25. A first order lag treating section 30 operates to calculate the pressure P(t) in the intake passage at a time t by making the calculation $$P(t) = \frac{((T/\Delta t) - 1) \times P(t - \Delta t) + P_B}{T/\Delta t}$$

($\Delta t$ is the operation interval)

A Qc calculator 31 is provided to calculate the quantity Qc in response to the output of the first order lag treating section 30 and the memory 25 to produce an output signal Qc. A Qe calculator 32 is provided to calculate the quantity Qe in response to output signals Qa, Qc of the airflow measuring section 22 and Qc calculator 31, and to produce an output signal Qe. The fuel injection time Tp is calculated at a Tp calculator 33 and the ignition timing is calculated at an ignition timing calculator 34 respectively in response to output signals N, Qe of the engine speed calculator 21 and Qe calculator 32. The output signal of the Tp calculator 33 is applied to injector 5 and the output signal of the ignition timing calculator 34 is applied to the ignition coil 6 to operate them respectively.

Figure 6:
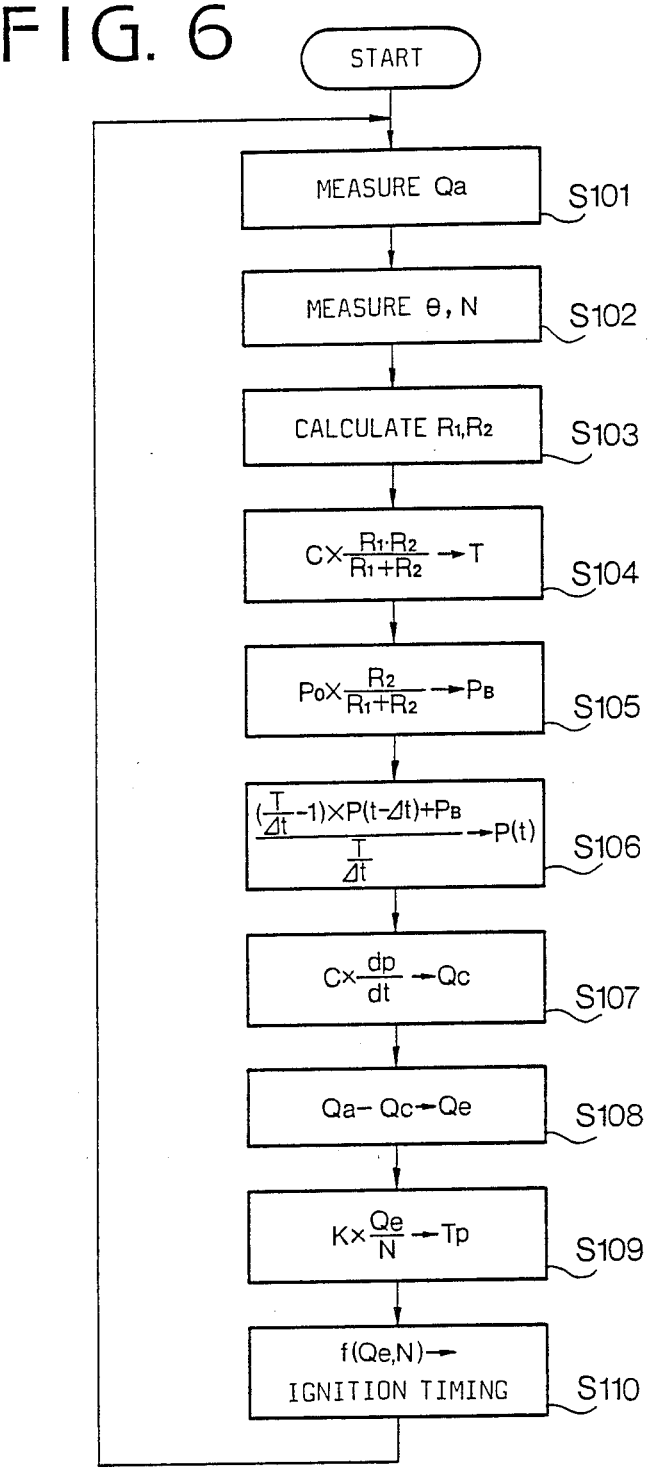
FIG. 6 is a flowchart showing the operation of the system of FIG. 3.

The operation of the system is described hereinafter with reference to FIGS. 3 and 6. The quantity Qa is measured at the airflow measuring section 22 based on the input from the airflow meter 10 (step S101). The throttle opening degree $\theta$ is obtained from the output signal of the throttle position sensor 11, and engine speed N is calculated at calculator 21 based on the output signal of crank angle sensor 13 (step S102). The resistances $R_1$ and $R_2$ are calculated at the $R_1$ and $R_2$ calculators 26, 27 based on data derived from the tables 23, 24 in accordance with the throttle opening degree $\theta$ and engine speed N (steps 103). The time constant T is calculated at the time constant calculator 28 based on the signals $R_1$, $R_2$ and C (step S104). The pressure calculator 29 makes the calculation of $P_B = Po \times R_2/(R_1 + R_2)$ based on the output signals of memory 25, calculators 26 and 27 (step S105). The pressure P(t) is obtained at the first order lag treating section 30 (step S106). The pressure P(t) and the constant C stored in the memory 25 are applied to the Qc calculator 31 to make the calculation $Qc = C \times dp/dt$ (step S107). The quantity Qe is calculated at Qe calculator 32 by the calculation Qa−Qc (step S108). The fuel injection time Tp is calculated at Tp calculator 33 by the calculation of $Tp = K \times Qe/N$ (step S109). Further, the ignition timing is calculated at ignition timing calculator 34 (step S110). The output signal of the Tp calculator 33 is applied to injectors 5 to inject the fuel for a proper period of time. The output signal of the ignition timing calculator 34 is applied to ignition coil 6 to ignite the fuel at a proper timing.

Although the above description is made about the operation at the time when the throttle valve is opened, the operation for the throttle valve closing is similar to the above described operation, thereby preventing the deviation of air-fuel ratio from increasing or decreasing.

Figure 8:
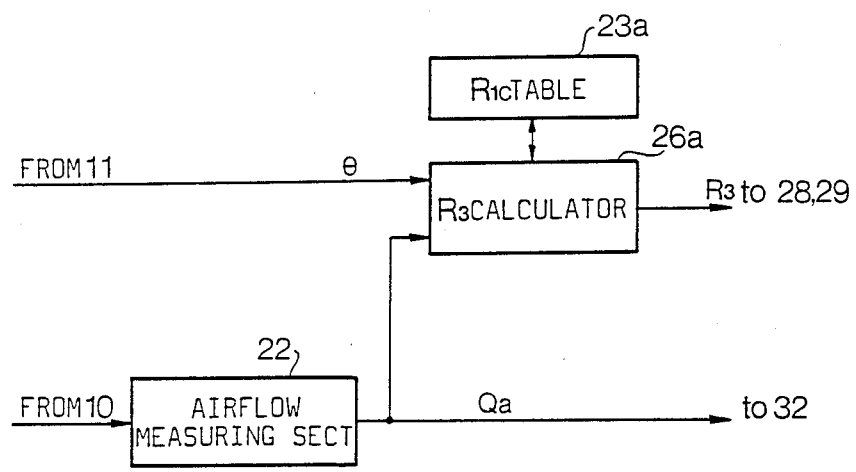
FIG. 8 is a block diagram showing a part of a system of a second embodiment of the present invention.

In the second embodiment of the present invention, as shown in FIG. 8, the resistance $R_1$ calculator in the first embodiment is substituted with an $R_3$ calculator 26a in which resistance $R_1$ is corrected by the quantity of intake air Qa.

A corrected resistance $R_3$ is represented as follows.

$$R_3 = R_{1c} \times Qa \times K$$

where $R_{1c} = R_1/Qa$ and K = coefficient.

Figure 9:
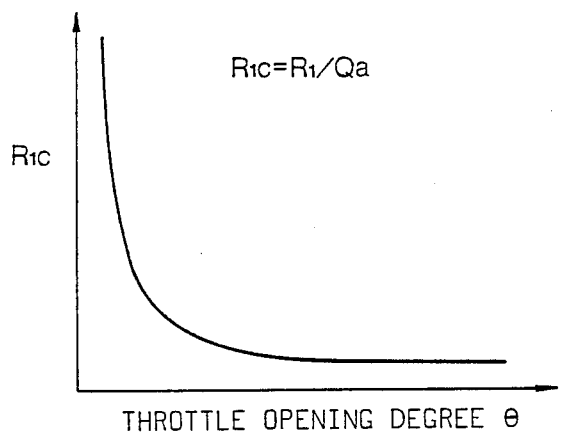
FIG. 9 is a graph showing the relationship between throttle opening degree $\theta$ and corrected resistance $R_{1c}$.

$R_{1c}$ is stored in an $R_{1c}$ table 23a as a function of the throttle opening degree $\theta$ (FIG. 9). The $R_3$ calculator 26a calculates the corrected resistance $R_3$ in response to output signal Qa of the airflow measuring section 22 and based on data derived from $R_{1c}$ table 23a in accordance with output signal $\theta$ of the throttle position sensor 11. The corrected resistance $R_3$ is applied to calculators 28 and 29. Other parts of the system are the same as the first embodiment and the same operation as the first embodiment is performed. In the second embodiment, since the resistance $R_1$ is corrected by the quantity Qa, more accurate operation is performed.

In accordance with the present invention, the quantity of intake air entered in spaces other than cylinders of the engine is calculated based on the pressure in the spaces. Accordingly, the actual quantity induced in the cylinders can be accurately measured.

While the presently preferred embodiment of the present invention has been shown and described, it is to be understood that this disclosure is for the purpose of illustration and that various changes and modifications may be made without departing from the spirit and scope of the invention as set forth in the appended claim.

What is claimed is:

1. A system for measuring quantity of intake air in an engine for a motor vehicle having an intake passage, a throttle valve provided in the intake passage, the intake passage including a first intake passage upstream of the throttle valve, and a second intake passage between the throttle valve and cylinders of the engine, comprising:
    an airflow meter provided in the first intake passage for measuring a first quantity of intake air passing in the first intake passage;
    first detector means for detecting opening degree of the throttle valve and for producing an opening degree signal;
    second detector means for detecting an engine speed and for producing an engine speed signal;
    first means responsive to the opening degree signal and to the engine speed signal for producing a pressure signal representative of pressure in the second intake passage, wherein the first means calculates the pressure based on pressure in the first intake passage, resistance at the throttle valve and resistance in the engine;
    second means responsive to the pressure signal for calculating a second quantity of intake entered into the second intake passage without entering into the cylinders; and
    third means for producing a signal representing quantity of intake air actually entered into the cylinders in accordance with the difference between the first quantity and the second quantity.

* * * * *